US011189994B2

(12) United States Patent
Lee

(10) Patent No.: US 11,189,994 B2
(45) Date of Patent: Nov. 30, 2021

(54) CIRCUIT BREAKER

(71) Applicant: LSIS CO., LTD., Anyang-si (KR)

(72) Inventor: Moonsub Lee, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 16/585,944

(22) Filed: Sep. 27, 2019

(65) Prior Publication Data

US 2020/0212659 A1 Jul. 2, 2020

(30) Foreign Application Priority Data

Dec. 28, 2018 (KR) .................... 10-2018-0172744

(51) Int. Cl.

| H02B 11/133 | (2006.01) |
|---|---|
| H01H 3/04 | (2006.01) |
| H01H 9/20 | (2006.01) |
| H01H 71/02 | (2006.01) |
| H02B 1/04 | (2006.01) |
| H02B 1/30 | (2006.01) |

(52) U.S. Cl.
CPC ............. *H02B 11/133* (2013.01); *H01H 3/04* (2013.01); *H01H 9/20* (2013.01); *H01H 71/0264* (2013.01); *H02B 1/04* (2013.01); *H02B 1/30* (2013.01)

(58) Field of Classification Search
CPC .......... H02B 11/133; H02B 1/04; H02B 1/30; H01H 3/04; H01H 9/20; H01H 71/0264; H01H 71/505; H01H 71/123; H01H 71/522; H01H 33/46; H01H 2003/3057; H02B 3/30; H01H 9/24; H01H 71/0221; H01H 71/1009
See application file for complete search history.

(56) References Cited

U.S. PATENT DOCUMENTS

| 7,964,809 B2 * | 6/2011 | Sapuram | H02B 11/133 |
|---|---|---|---|
| | | | 200/50.21 |
| 2010/0294629 A1 * | 11/2010 | Kim | H01H 71/126 |
| | | | 200/50.24 |

FOREIGN PATENT DOCUMENTS

| CN | 103187201 A | 7/2013 |
|---|---|---|
| KR | 20100125807 A | 12/2010 |
| KR | 2020110009725 | 10/2011 |
| KR | 1020130096571 | 8/2013 |
| KR | 101912449 B1 | 10/2018 |

OTHER PUBLICATIONS

Korean Office Action for related Korean Application No. 10-2018-0172744; action dated Nov. 4, 2019; (5 pages).
Chinese Notice of Allowance for related Chinese Application No. 201910927432.X; action dated Sep. 27, 2021; (10 pages).

* cited by examiner

*Primary Examiner* — Ahmed M Saeed
(74) *Attorney, Agent, or Firm* — K&L Gates LLP

(57) ABSTRACT

The present disclosure relates to a circuit breaker equipped with an energy release device of a switching mechanism, and particularly, to a circuit breaker equipped with an energy release device that allows energy of a closing spring of a switching mechanism to be automatically discharged at the time of a withdrawal operation.

15 Claims, 15 Drawing Sheets

DISCONNECTED   TEST                                        SERVICE

CIRCUIT BREAKER

CROSS-REFERENCE TO RELATED APPLICATION

Pursuant to 35 U.S.C. § 119(a), this application claims the benefit of earlier filing date and right of priority to Korean Application No. 10-2018-0172744, filed on Dec. 28, 2018, the contents of which is incorporated by reference herein in its entirety.

FIELD OF THE INVENTION

The present disclosure relates to a circuit breaker equipped with an energy release device of a switching mechanism, and particularly, to a circuit breaker equipped with an energy release device that allows energy of a closing spring of a switching mechanism to be automatically discharged at the time of a withdrawal operation.

BACKGROUND OF THE INVENTION

In general, a circuit breaker is an electric instrument that is installed in part of an electric system to protect the circuit and load by automatically breaking the circuit in an electrical overload state or a short circuit fault.

The circuit breaker generally includes a terminal part that may be connected to a power side or load side, a contact part including a fixed contact and a movable contact that may come in contact with or be separable from the fixed contact to connect or separate the circuit, a switching mechanism that moves the movable contact to supply power required to open/close the circuit, a trip part that detects an over-current or short circuit current at the power side to induce a trip motion of the switching mechanism, and an extinction part that extinguishes an arc occurred in cutting off an abnormal current.

Among these circuit breakers, vacuum breakers, etc., are used as circuit breakers configured to protect the power system by blocking the circuit in case of hazardous situations such as short circuit or over current. Vacuum breakers are products that protect lives and breakers by blocking circuits from vacuum interrupters (VI) inside the breaker by external relays when abnormal currents such as over-currents, short circuits and ground fault occur on the special high/high pressure distribution lines.

These high-pressure circuit breakers are installed with distribution boards that incorporate and manage several electrical devices, including the breakers, for operation, control, and operation of the motors, such as power stations and substations, and are normally stored and used inside a cradle fixed on the distribution board.

Inside the cradle is a service position where the terminal of the circuit breaker is connected to the load terminal of the cradle and provided with voltage and current, and a test position where the terminal of the circuit breaker is separated from the terminals of the cradle so that only the operational test of the breaker can be performed.

The circuit breaker is equipped with a closing spring and trip spring to provide the power to perform a closing or trip operation.

The circuit breaker is in a state where the energy of the closing spring is charged during operation. In other words, the spring energy is charged in preparation for a re-closing operation after blocking the accident current.

In FIGS. 1 through 3, a circuit breaker according to the conventional art is shown. In the drawings, a breaker body 2 is inserted into a breaker chamber 1. FIGS. 1 through 3 show disconnect, test, and service (connected) states, respectively.

The breaker body 2 is carried on the cradle 3 and moves to each position inside the breaker chamber 1.

Meanwhile, the breaker body 2 is equipped with an instrumental mechanism 4 to perform actions related to the closing and opening operations of the contact part.

In addition, the conditions of the instrumental mechanism in each state (disconnect, test, and connected states) are illustrated in FIGS. 4 through 6. In addition, the internal structure of the breaker is illustrated in FIG. 7.

The instrumental mechanism of a large circuit breaker includes a closing latch 13 for the operation of the closing spring, a trip latch 14 for the operation of the trip spring, a power shaft 5 that rotates by the drive force of a motor (not shown), a drive lever 6, a crank shaft 7, a motion lever 8, an interlock rod 9, a position interlock device 10 for preventing the closing operation during insertion/withdrawal operations, a closing interlock device 11 for preventing the operation of the closing latch during insertion/withdrawal operations, and an interlock operation rail 12.

The mechanism operation of a large circuit breaker does not load (charge) the closing spring in the initial state (disconnected state), as shown in FIGS. 1 and 4. When the breaker body 2 enters the test state, as shown in FIGS. 2 and 5, the crank shaft 7 rotates and the closing spring is loaded. At this time, the crank shaft 7 is caught at the end of the closing latch 13 and is ready for the closing of the circuit breaker. Operation of the closing latch 13 (restriction is released), as shown in FIG. 6, rotates the crank shaft 7 while also rotating the motion lever 8 to perform the circuit closing operation.

In the state, as in FIG. 6, when the trip latch 14 is operated (restriction is released), the instrumental mechanism is returned again to the initial position, as shown in FIG. 4.

Meanwhile, in the conventional art, the position interlock device 10 operates in conjunction with the interlock operation rail 12 at the bottom of the circuit breaker, as shown in FIG. 8 so that the large circuit breaker can only perform the closing/trip operation in the specified three positions (disconnected, test, and connected positions).

In each position (disconnected, test, and connected), as shown in FIG. 8, the position interlock device 10 moves down, causing the interlock rod 9 linked to the position interlock device 10 to move down, which also lowers the interlock device 11 linked to the interlock rod 9, enabling the closing latch 13 to be operated.

If the position interlock device 10 moves up along the interlock operation rail 12, the movement of the closing latch 13 is constrained.

In the conventional art, the closing spring is charged (recharged) and made possible if the breaker is placed in each position within the breaker chamber, as shown in FIGS. 1 to 3. In addition, the closing interlock device 11 prevents the circuit closing operation while in moving.

However, since the insertion/withdrawal operations are carried out with the closing spring charged, the breaker is withdrawn with the closing spring charged unless the user manually actuates the closing button to release the loaded energy during the test.

In such a case, there is a risk of an accident due to maintenance work or operational error.

SUMMARY OF THE INVENTION

Therefore, an aspect of the detailed description is to provide a circuit breaker equipped with a release device that automatically releases energy from the closing spring of the switching mechanism upon withdrawal.

To achieve these and other advantages and in accordance with the purpose of this specification, as embodied and broadly described herein, a circuit breaker including a breaker body with a closing latch for a circuit closing operation and a trip latch for a trip operation, and a cradle that performs insertion/withdrawal movements inside a breaker chamber in a state of carrying the breaker body thereon, may include an interlock operation rail installed at the cradle and set with disconnected, test and connected positions, and an interlock member configured to operate the closing latch and trip latch at sections other than the disconnected, test and connected positions while moving up and down by interlocking with the relative motion of the interlock operation rail.

Here, the interlock member may include an interlock plate which is either in contact with or separated from the closing latch and trip latch, and an interlock rod which is joined at the bottom of the interlock plate and is in contact with the interlock operation rail.

In addition, the interlock member may be equipped with a return spring installed on the interlock rod to return the interlock member to the lower position.

In addition, a sliding hole may be formed at the top of the interlock member to enable upward and downward motion on a protrusion of the breaker body.

In addition, the interlock plate may include a first lever that protrudes at one side thereof to contact the closing latch.

In addition, the interlock plate may include a second lever that protrudes at one side thereof to contact the trip latch.

In addition, the ends of the first and second levers may be bent and extended upward.

In addition, the distance between the ends of the first and second levers may be less than the distance between the closing latch and the trip latch.

In addition, under normal conditions, the gap between the closing latch and the first lever may be greater than the gap between the trip latch and the second lever.

In addition, the interlock plate has a protruding locking part on the other side, which may be engaged to move with the closing latch to restrain or disengage the closing protrusion.

In addition, the interlock operation rail may include a height adjustment block with different heights in front and rearward directions at the top.

In addition, the height adjustment block may have grooves in each of the disconnected position, the test position and the connected position.

In addition, each groove may have the same height.

In addition, the height adjustment block may include a first convex part between the disconnected position and the test position, and the first convex part may be formed at the highest height of the height adjustment block.

In addition, the height adjustment block may include a second convex part between the test position and the connected position, and the second convex part may be formed to be lower than the first convex part and higher than the grooves.

According to the circuit breaker in accordance with the present disclosure, it is not necessary to manually release the charged energy to the closing spring, since the trip and closing operations are performed automatically in non-operating positions when the breaker is withdrawn, releasing the charged energy to the closing spring.

Accordingly, the user's safety is promoted by preventing situations in which closing operation is automatically executed without the user's knowledge upon re-insertion after withdrawal of the breaker.

BRIEF DESCRIPTION OF THE DRAWINGS

FIGS. 12 through 15 are views illustrating operational states of the circuit breaker in accordance with one embodiment of the present disclosure, in which FIGS. 12 and 13 are front and rear views in between the disconnected position and the test position, and FIGS. 14 and 15 are front and rear views in between the test position and the connected position.

DETAILED DESCRIPTION OF THE INVENTION

Figure 1:
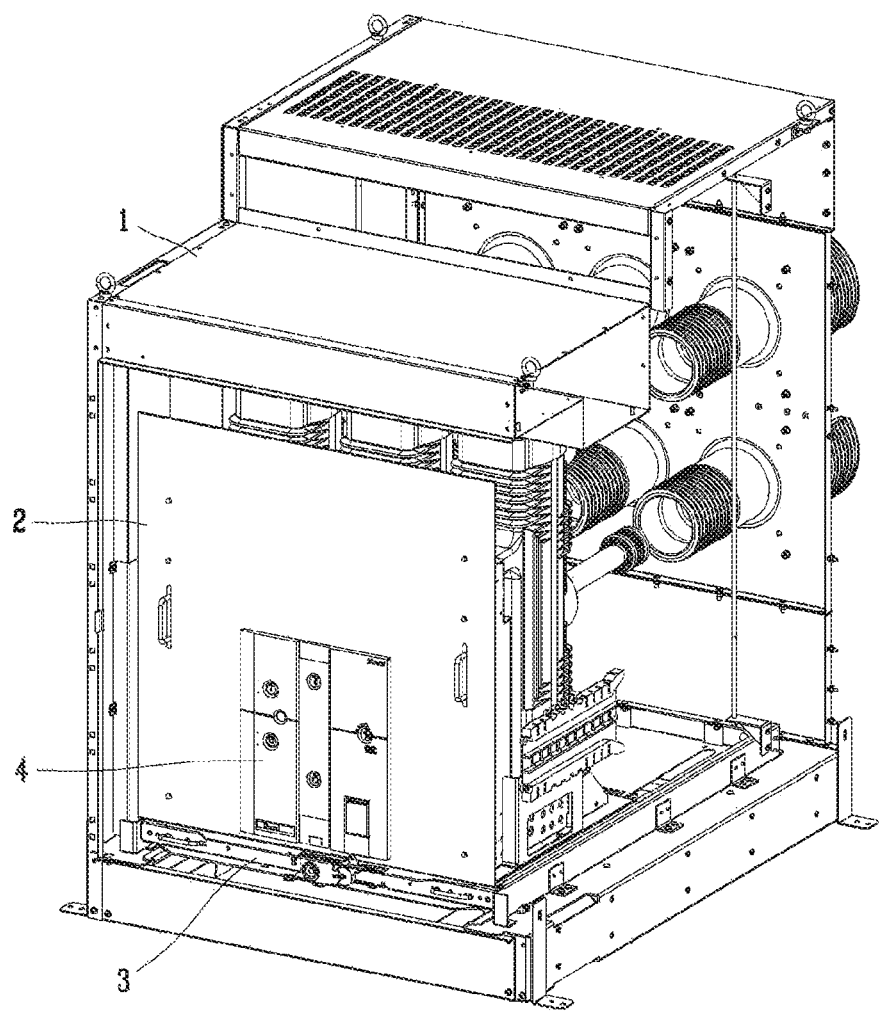
FIGS. 1 through 3 are views illustrating the states of a conventional circuit breaker in disconnected, test and connected positions, respectively.
Figure 2:
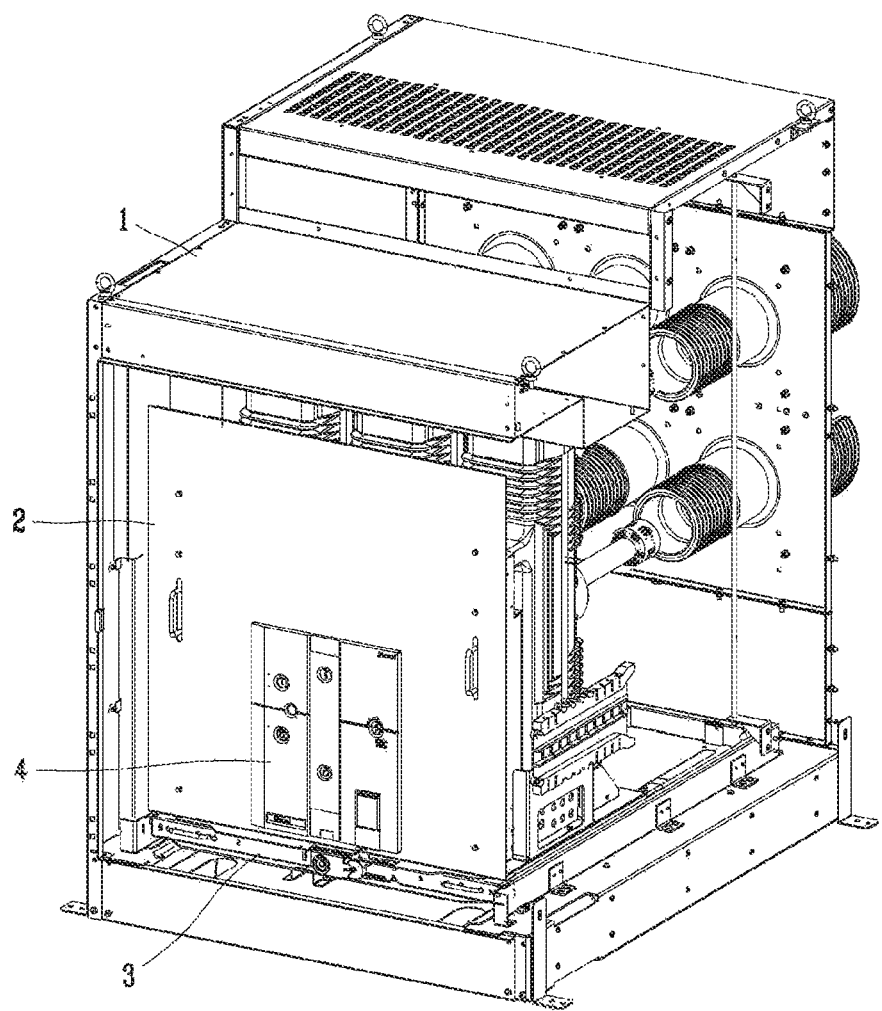
Figure 3:
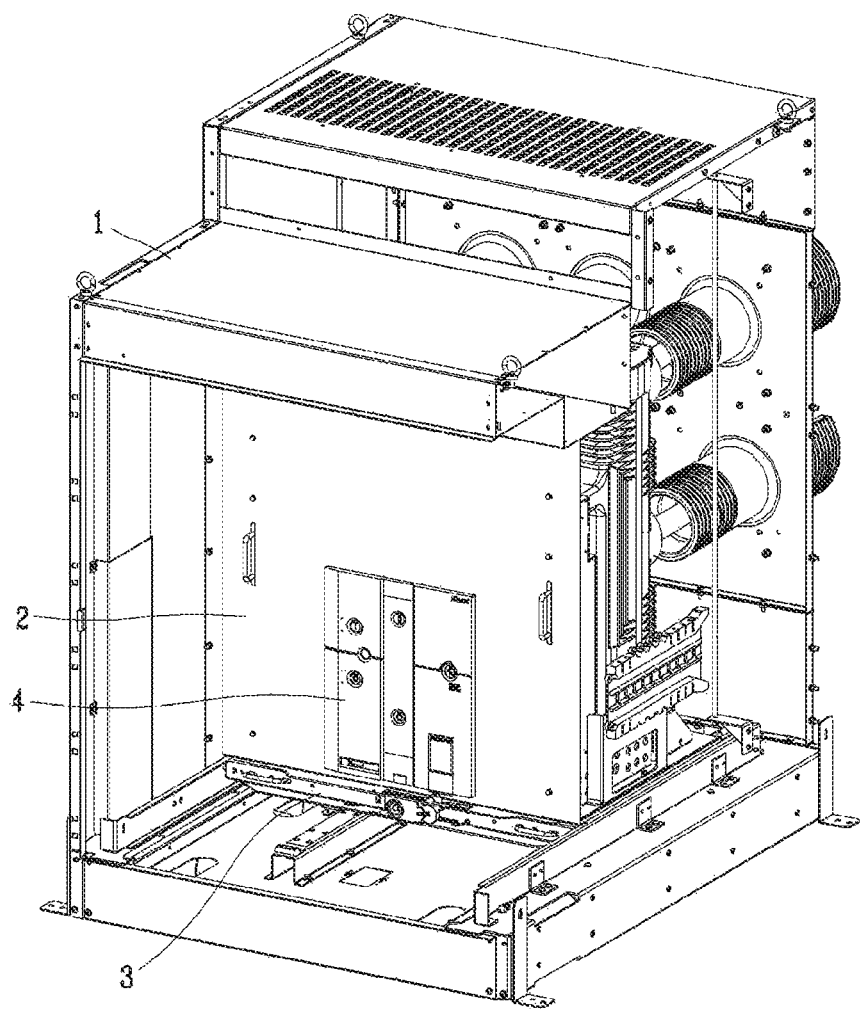
Figure 4:
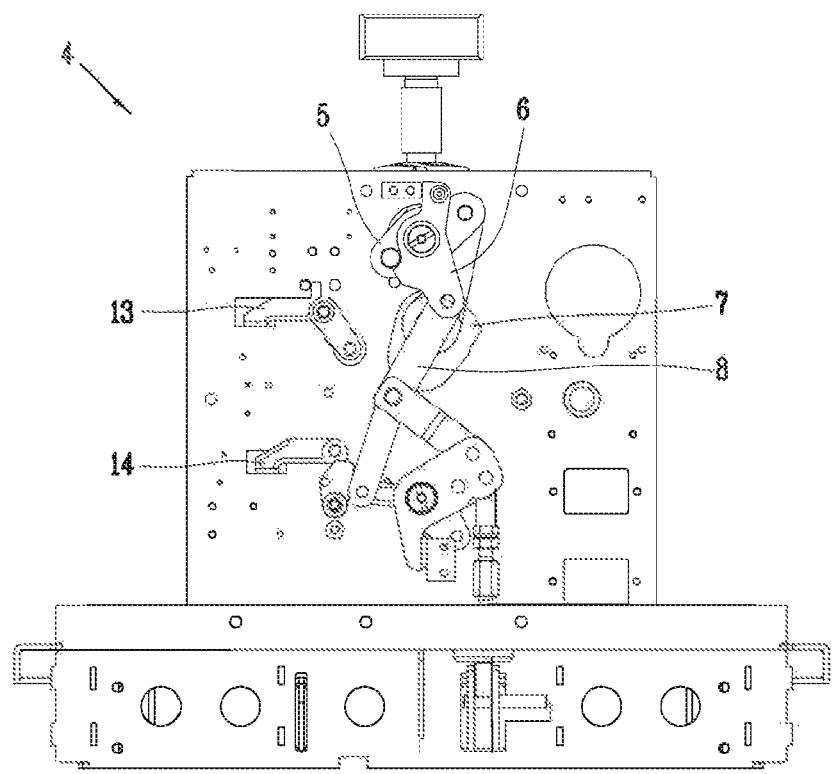
FIGS. 4 through 6 are views illustrating the instrumental mechanism in disconnected, test and connected positions, respectively.
Figure 5:
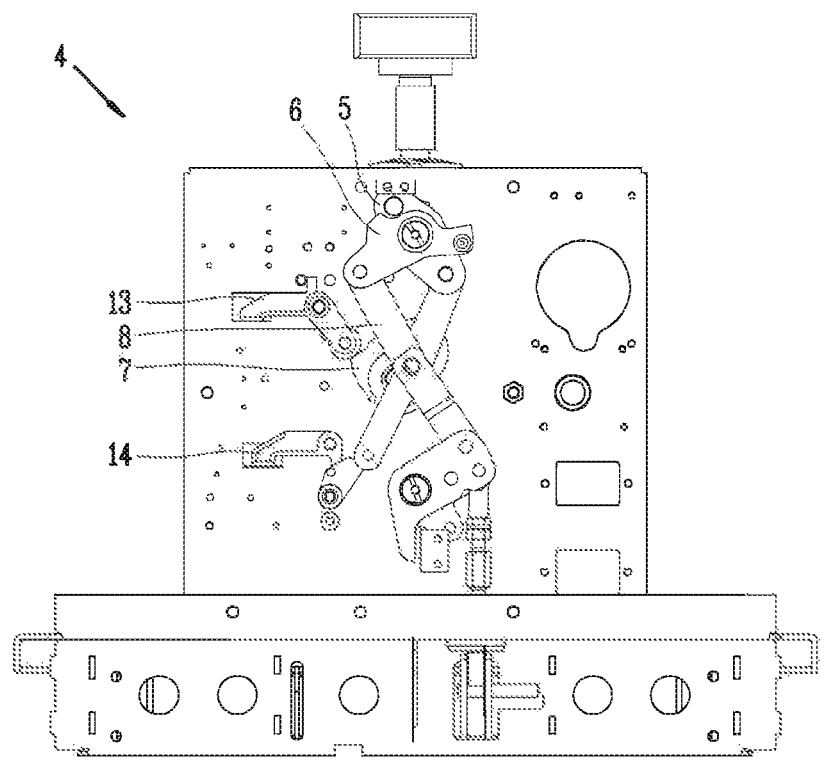
Figure 6:
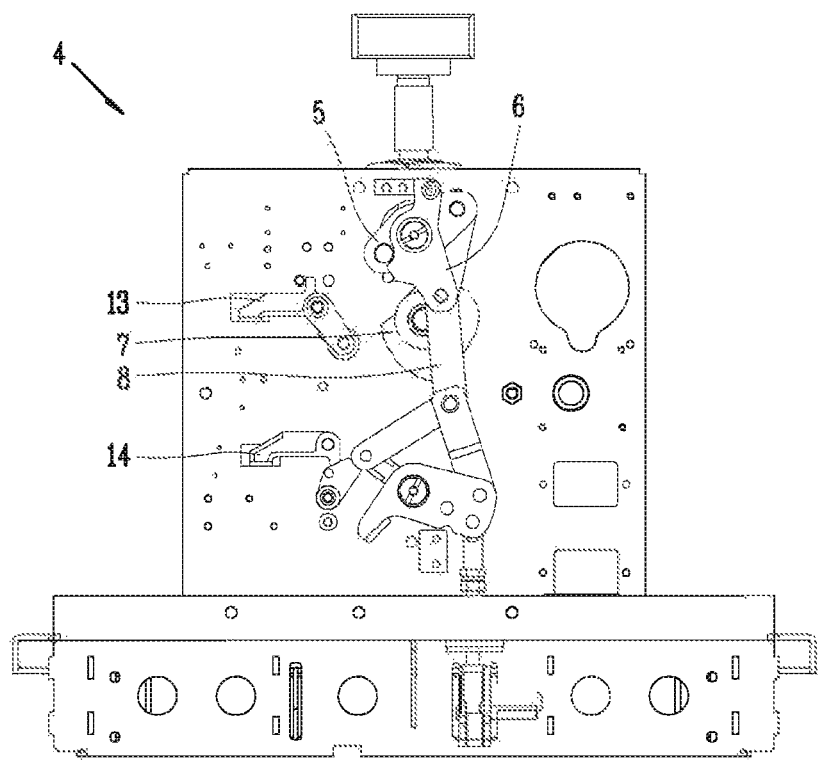
Figure 7:
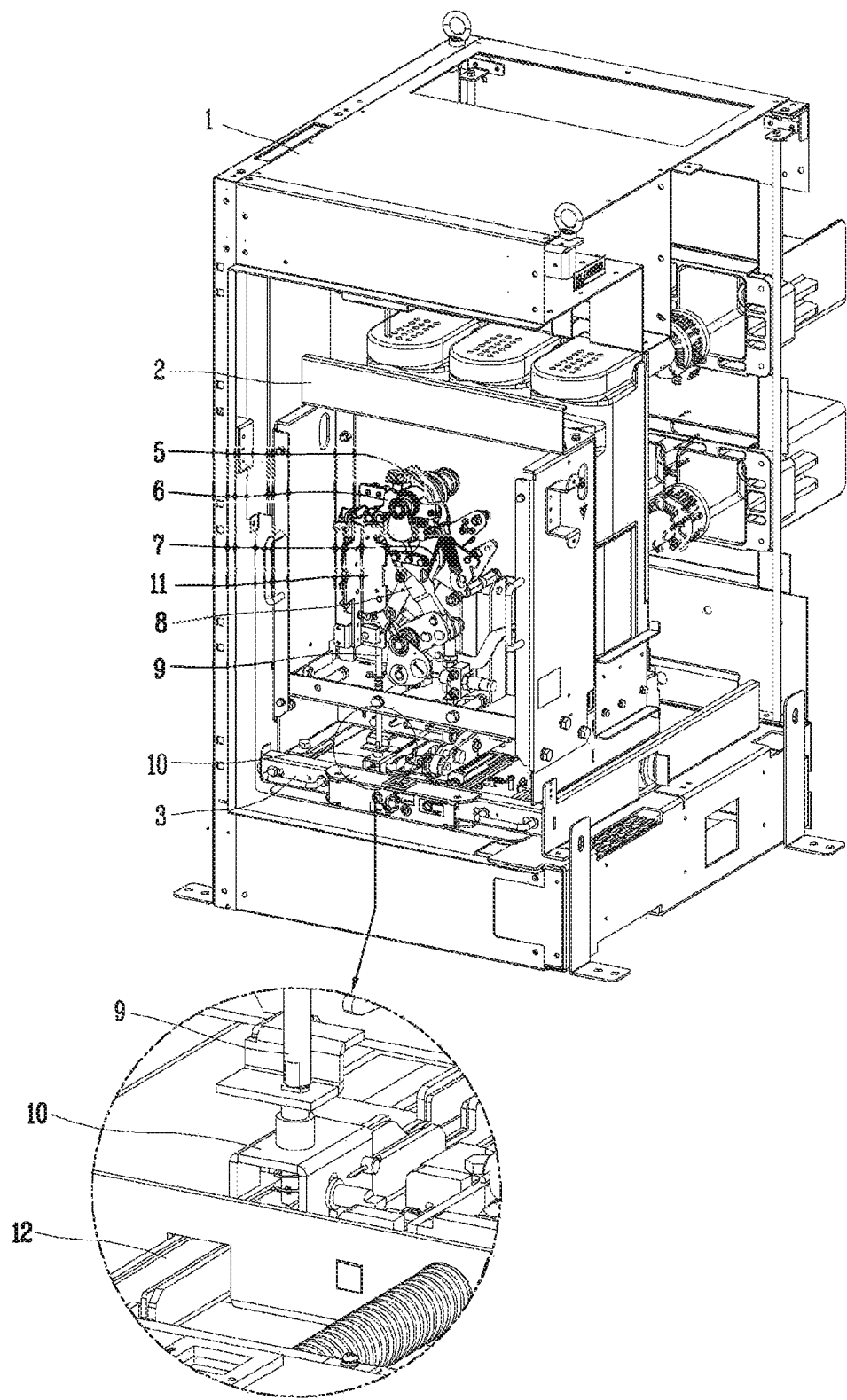
FIG. 7 is an internal perspective view illustrating the conventional circuit breaker.
Figure 8:
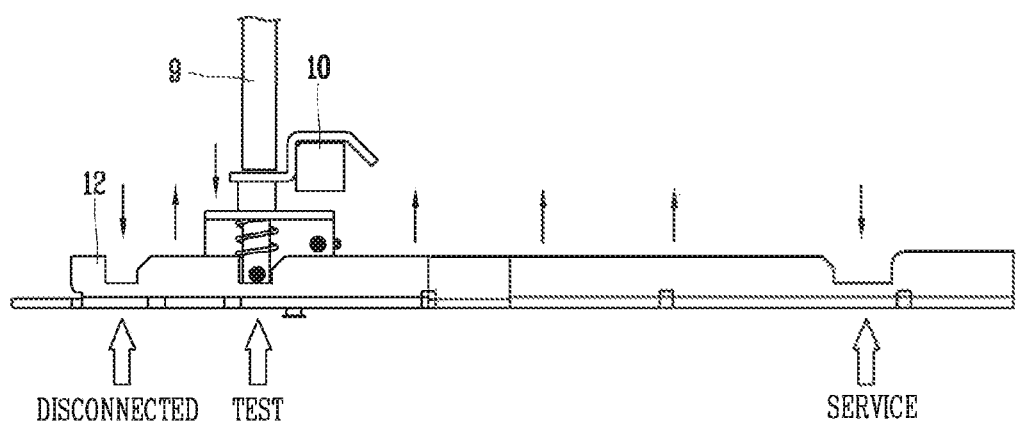
FIG. 8 is a view illustrating operations of a position interlock device and an interlock rail of the conventional circuit breaker.

Hereinafter, preferred embodiments of the present invention will be described with reference to the accompanying drawings, so that a person skilled in the art can easily carry out the invention. It should be understood that the technical idea and scope of the present invention are not limited to those preferred embodiments.

Hereinafter, description will be given in detail of the circuit breaker in accordance with the embodiments of the present disclosure.

The circuit breaker in accordance with the embodiments of the present disclosure includes a breaker body 25 including a closing latch 34 for a circuit closing operation and a trip latch 35 for a trip operation, and a cradle 30 that carries the breaker body 25 and performs insertion/withdrawal operations within a breaker chamber 20, further includes an interlock operation rail 70 installed on the cradle 30 and set with a disconnected position 71, a test position 73 and a connected position 75, and interlock members 40 and 50 configured to operate the closing latch 34 and the trip latch 35 at the section other than the disconnected position 71, the test position 73 and the connected position 75, while interworking with the relative motion of the interlock operation rail 70.

Figure 9:
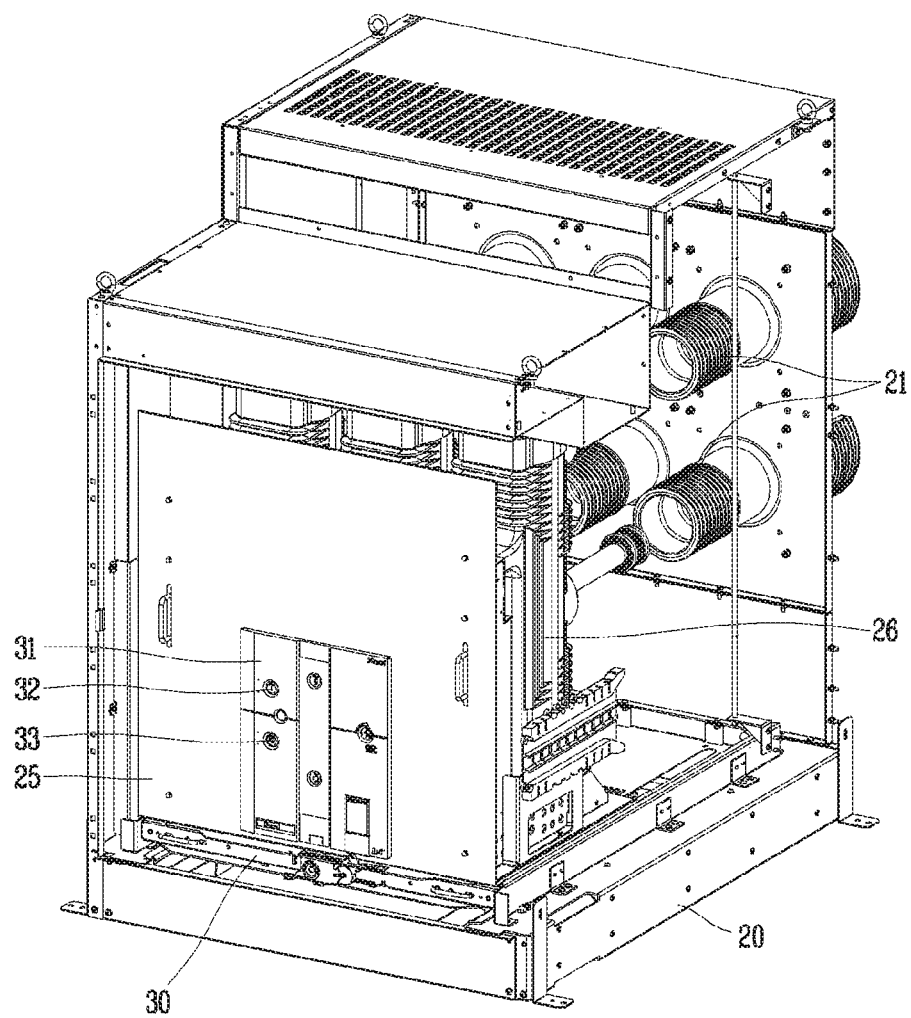
FIG. 9 is a perspective view illustrating a circuit breaker in accordance with an embodiment of the present disclosure.

FIG. 9 illustrates the circuit breaker in accordance with an embodiment of the present disclosure.

The breaker chamber 20 is provided in the same form as a cabinet or as a box.

For convenience of understanding, the front door and side plates are removed. In the breaker chamber 20, a terminal bushing 21 is installed on the rear panel by each phase. The terminal bushing 21 may be equipped with a pair of upper and lower terminal bushings for each phase. In this case, each is connected to a power source or load. In other words, the upper terminal may be connected to a power source and the lower terminal may be connected to a load.

The breaker body 25 is carried on the cradle 30 and is inserted into or withdrawn from the breaker chamber 20. The breaker body 25 may be inserted into and withdrawn by the cradle 30 from the inspection position (disconnected state), the preparation position (test state), and the service position (connected state).

The breaker body 25 is equipped with a blocking part 26 that may be connected to the main circuit for each phase to make conductive or cut off the circuit. In the case of circuit breakers installed in high voltage power systems, vacuum breakers, etc. may be used as breakers. Vacuum breakers protect lives and load instruments by blocking circuits from the vacuum interrupter (VI) inside the cut-off zone by means of a separate external relay in case of abnormal current, such as over-current, short circuit and ground fault on the special high-pressure/high-pressure distribution track.

The blocking part 26 may be prepared for each phase. The blocking part 26 is equipped with fixed and movable contacts. As for the blocking part 26 applied to high voltage circuits, a vacuum interrupter may be applied.

The breaker body 25 is equipped with an instrumental mechanism 31. The instrumental mechanism 31 provides the power to close or break the circuit, and an on-button 32 and an off-button 33 are exposed to the outside. The user may operate the on and off-buttons 32 and 33 to close or turn off the breakers.

Figure 10:
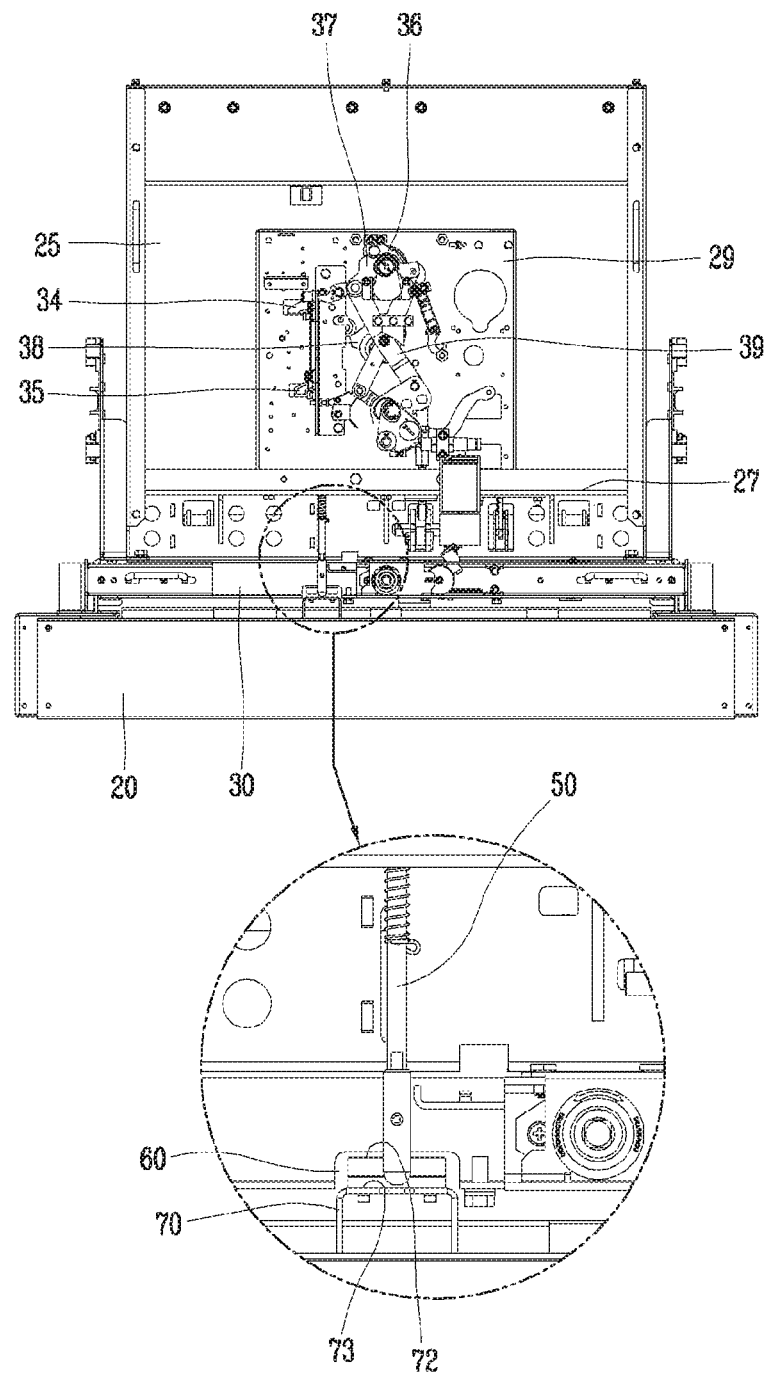
FIGS. 10 and 11 are front and rear views of a switching mechanism of the circuit breaker of FIG. 9 in a test position.

FIG. 10 is a front and rear views illustrating the switching device of the circuit breaker, in which the external plate of the instrumental mechanism 31 is removed.

The instrumental mechanism 31 is equipped with a trip latch 34 connected to the on-button 32, and a trip latch 35 connected to the off-button 33. According to the embodiment, the on-button 32 and the closing latch 34 may be integrally formed as one, and the off-button 33 and the trip latch 35 may be integrally formed as one.

In addition, the instrumental mechanism 31 is equipped with a charging shaft 36, which provides power to the closing spring (not shown). A driving lever 37 is prepared in interlocking with the charging shaft 36.

Meanwhile, a crank shaft 38 is prepared to transmit the force for closing or tripping operation. The crank shaft 38 is connected with an operation lever 39.

Meanwhile, the cradle 30 has a rail groove 60 which allows the interlock operation rail 70 to operate thereon. The interlock operation rail 70 may be moved in a front and rear direction through the rail groove 60 formed in the cradle 30.

Interlock members 40 and 50 are provided on the rear surface of a mounting plate 29 of the instrumental mechanism 31. The interlock members 40 and 50 include an interlock plate 40 on the top and an interlock rod 50 on the bottom.

The interlock plate 40 is configured to automatically activate the closing and trip functions in the test position to discharge the energy charged to the closing spring or trip spring.

Figure 17:
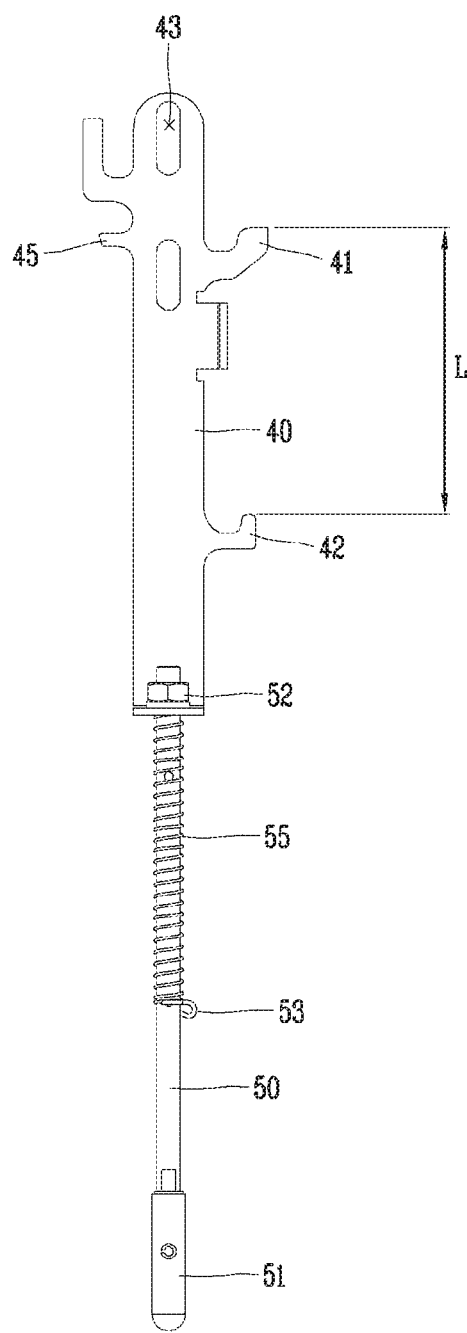
FIG. 17 is a front view illustrating the interlock member applied to the circuit breaker in accordance with the present disclosure.

Referring to FIG. 17, the interlock members 40 and 50 may include the upper interlock plate 40 and the lower interlock rod 50. At this time, the interlock plate 40 and the interlock rod 50 may be joined together by screws 52, etc. to move integrally.

On the upper part of the interlock plate 40, a sliding hole 43 is formed and a protrusion 28 of the mounting plate 29 is fitted for sliding. The interlock plate 40 may be moved up and down by the sliding action between the protrusion 28 and the sliding hole 43.

The interlock plate 40 has a first lever 41 that may contact one side of the closing latch 34 to activate the closing latch 34. The end of the first lever 41 may be bent to the top.

The interlock plate 40 has a second lever 42 that may contact one side of the trip latch 35 to activate the trip latch 35. The end of the second lever 42 may be bent to the top.

Here, the first lever 41 and the second lever 42 are formed on one side of the interlock plate 40. In other words, they are formed to protrude in the same direction.

The first lever 41 and the second lever 42 may contact the closing latch 34 or the trip latch 35 when the interlock plate 40 is in the upward motion, respectively.

Figure 11:
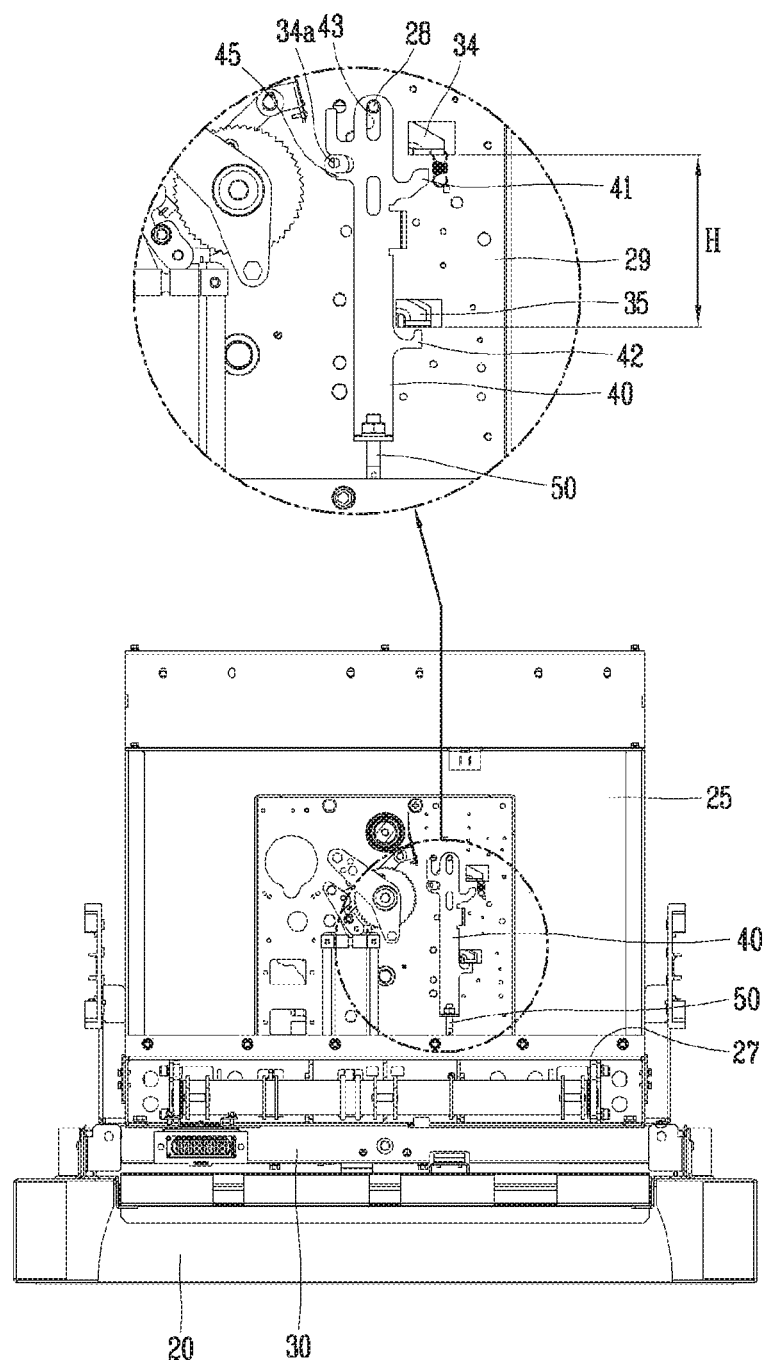

Here, the distance (L) between the end (contact portion) of the first lever 41 and the second lever 42 is less than the distance (H, refer to FIG. 11) between the closing latch 34 and the trip latch. The gap between the closing latch 34 and the first lever 41 in the normal state (e.g., no external force is acting on each latch and interlock member, i.e., each is not operated and the interlock member is lowered) is greater than the gap between the trip latch 35 and the second lever 42. Thus, when the interlock plate 40 is in the upward motion, the second lever 42 first contacts the trip latch 35, and then the first lever 41 contacts the closing latch 34.

The interlock plate 40 has a locking part 45 on the other side formed in a protruding manner. The locking part 45 may restrain or release the closing protrusion 34a which is coupled to the closing latch 34.

An interlock rod 50 is fitted to the underside of the interlock plate 40. The interlock rod 50 may include a rod-shaped body and a contact end 51, which is fitted to the underside of the body. The contact end 51 contacts the position interlock operation rail 70 and moves up and down along the position of the interlock operation rail 70. The movement of the contact end 51 causes the interlock members 40 and 50 to move up and down.

The interlock rod 50 is equipped with a return spring 55. When no upward force is received at the end of the contact 51, the interlock rod 50 is returned to the lower position, where the up and down movement occurs rapidly along the interlock operation rail 70 by the return spring 55.

The return spring 55 has a fixing part 53 at a lower end. The fixing part 53 may be provided in part of the interlock rod 50.

The top of the return spring 55 may be installed in the lower plate 27 of the instrumental mechanism 31. The return spring 55 is compressed and tensile between the lower plate 27 and the fixing part 5 as the interlock members 40 and 50 move up and down.

Figure 16:
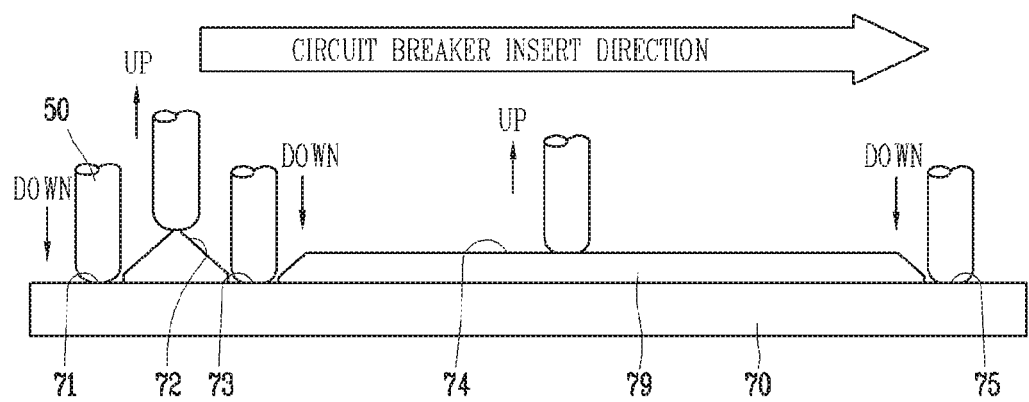
FIG. 16 is a view illustrating operational states of the interlock member and interlock operation rail in the circuit breaker in accordance with the present disclosure.

Referring to FIG. 16, an interlock operation rail 70 is provided. The interlock operation rail 70 may be fixed at the bottom of the breaker chamber 20. Accordingly, the movement of the cradle 30 may change the position of the contact end 51 of the interlock members 40 and 50 which are in contact with the interlock operation rail 70.

The interlock operation rail 70 includes a height adjustment block 79 at the top. The height adjustment block 79 has a stair or polygonal block shape to form a height difference in the front and rear directions.

The height adjustment block 79 of the interlock operation rail 70 includes grooves at the disconnected position 71, the test position 73, and the connected position 75. The grooves may be formed at the same height in the three positions.

A first convex part 72 is formed between the disconnected position 71 and the test position 73 of the height adjustment block 70 of the interlock operation rail 70. The first convex part 72 is formed at the highest height in the height adjustment block 79. In the first convex part 72, the contact end 51 of the interlock members 40 and 50 is raised to the maximum extent and the first lever 41 operates the closing latch 34.

A second convex part 74 is formed between the test position 73 and the connected position 75 of the height adjustment block 79 of the interlock operation rail 70. The second convex part 74 is formed in the height after the first convex part 72 at the height adjustment block 79. The height of the second convex part 74 is higher than the height of the disconnected position 71, and lower than the height of the first convex part 72. In the second convex part 74, the contact end 51 of the interlock members 40 and 50 is raised to a certain extent and the second lever 42 operates the trip latch 35. In the second convex part 74, the first lever 41 does not operate the closing latch 34.

Referring to FIGS. 10 through 16, description will be given of the actions of interlock members 40 and 50 and the interlock operation rail 70 in the circuit breakers in accordance with an embodiment of the present disclosure.

When the position of the breaker body 25 (and the cradle 30) is in the disconnected, test and connected positions, respectively, the interlock members 40 and 50 are located in the disconnected position 71, the test position 73, and the connected position 75, respectively.

In this position (state), the first and second levers 41 and 42 do not operate the closing latch 34 and the trip latch 35 since the interlock members 40 and 50 are in the lower position. Of course, the user may perform closing or trip operation by manual operation.

Figure 14:
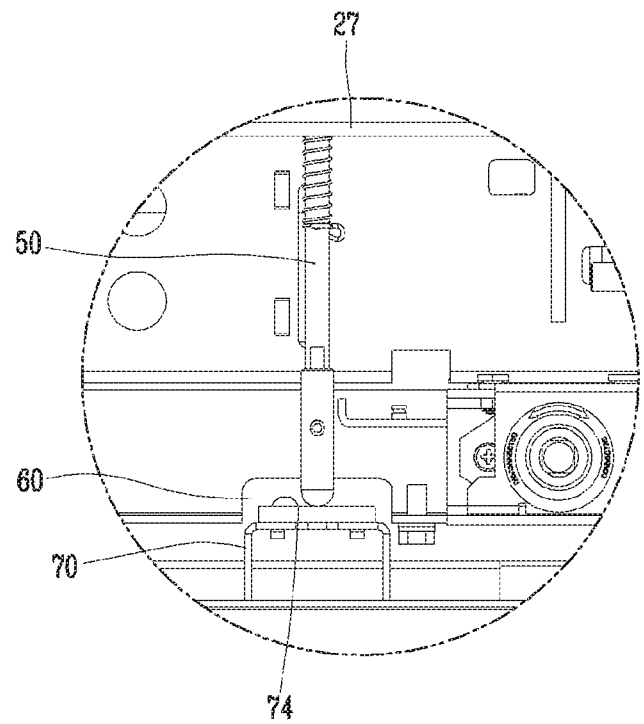
Figure 15:
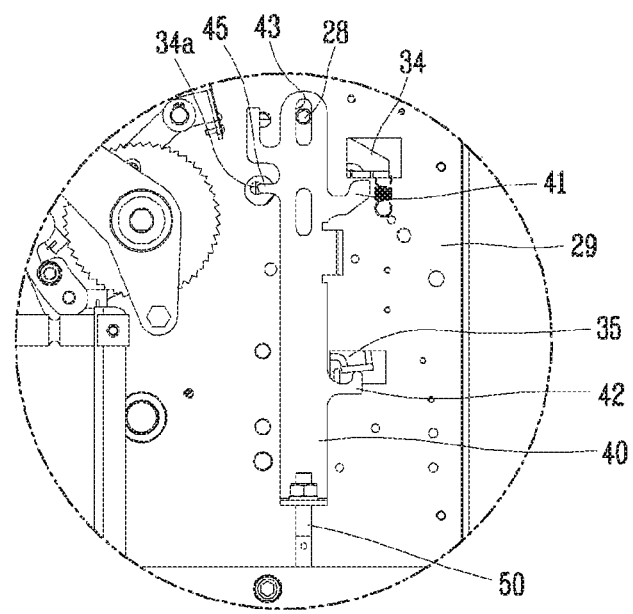

When the breaker body 25 moves between the test position 73 and the connected position 75, as shown in FIGS. 14 and 15, the interlock rod 50 is raised by the height control block 79, so that the interlock plate 40 rises by the height of the second convex part 74 and automatically activates the trip latch 35.

As a result, the breaker which is in the closed state changes to the cut-off (open) state. Thus, the user may safely withdraw the breaker body 25. Even when the user fails to operate the trip, the trip operation is performed automatically while the user moves the trip from the connected position 75 to the test position 73, so the breaker body 25 may be withdrawn in a safe state.

Meanwhile, when the breaker body 25 is moved in the section between the test position 73 and the connected position 75, the closing latch 34 is not operated since the closing protrusion 34a is caught by the locking part 45. In other words, anti-closing functions are performed during moving.

Figure 12:
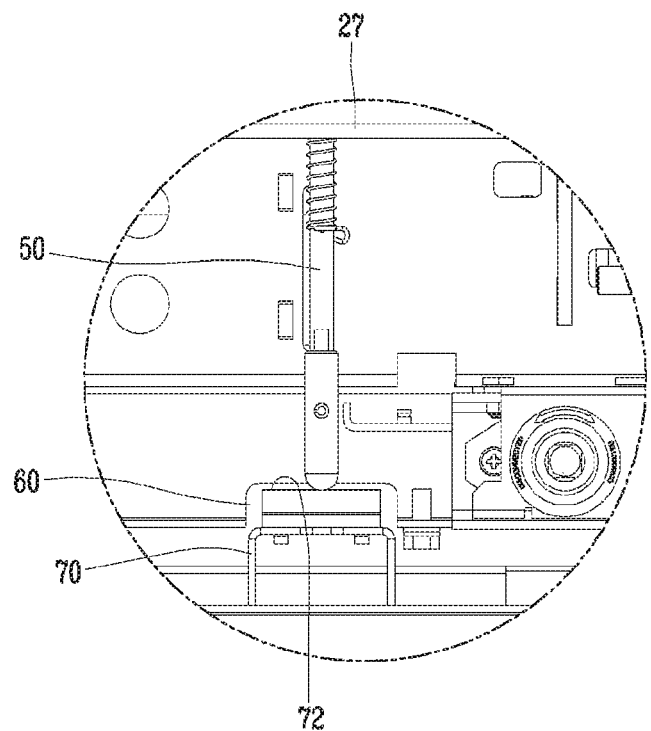
Figure 13:
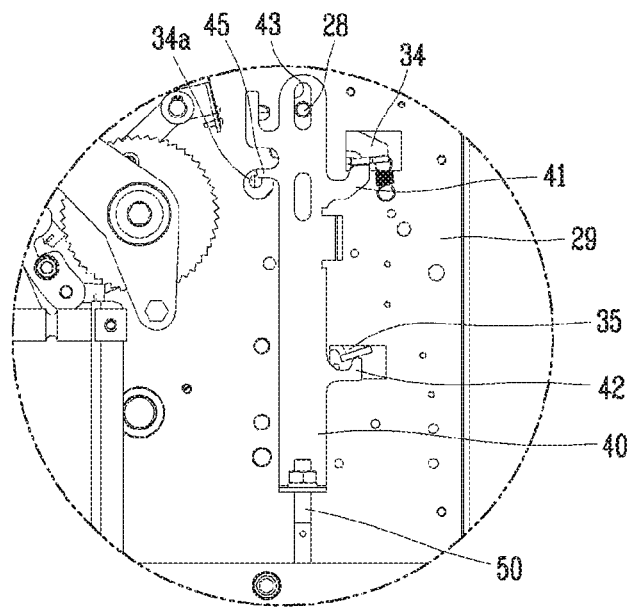

As shown in FIGS. 12 and 13, when the breaker body 25 moves the section between the disconnected position 71 and the test position 73, the interlock rod 50 is raised by the height control block 79, so that the interlock plate 40 is raised as much as the height of the first convex part 72 and automatically activates the closing latch 34.

As a result, the energy charged (recharged) to the closing spring is discharged, making it impossible to make a circuit closing operation. Thus, the user can safely withdraw the breaker body 25. The breaker body 25 is withdrawn in a safe state, since the closing operation is performed automatically during the user's move from the test position 73 to the disconnected position 71, even if the user does not perform the closing operation manually at the test position 73. Since the closing operation is not in the connected position, the operation of the closing spring is performed only, since the contact parts of the breakers are not in the closed state. Of course, the trip latch 35 is also operated by the second lever 42, so the trip operation is also performed.

Accordingly, the breaker body 25 can be safely withdrawn with the energy of the closing spring released.

In addition, sound generated by the action of the closing spring makes the user aware of the final state of the circuit breaker (Open, Spring Discharged), enabling safe operation of the user's work.

According to the circuit breaker in accordance with the embodiment of the present disclosure, it is not necessary to manually release the charged energy to the closing spring, since trip and closing actions are performed automatically in non-operating positions when the breaker is withdrawn, releasing the charged energy to the closing springs.

Accordingly, the user's safety is promoted by preventing situations in which closing operation is automatically executed without the user's knowledge upon re-entry after withdrawal of the breaker.

While the invention has been shown and described with reference to the foregoing preferred embodiments thereof, it will be understood by those skilled in the art that various changes and modifications may be made without departing from the spirit and scope of the invention as defined by the appended claims. Therefore, the embodiments disclosed in the present disclosure are not intended to limit the scope of the present disclosure but are merely illustrative, and it should be understood that the scope of the technical idea of the present disclosure is not limited by those embodiments. That is, the scope of protection of the present invention should be construed according to the appended claims, and all technical ideas within the scope of equivalents thereof should be construed as being included in the scope of the present invention.

What is claimed is:

1. A circuit breaker including a breaker body with a closing latch for a circuit closing operation and a trip latch for a trip operation, and a cradle that performs insertion/withdrawal movements inside a breaker chamber in a state of carrying the breaker body thereon, comprising:
    an interlock operation rail installed at the bottom of the breaker chamber and set with disconnected, test and connected positions, and
    an interlock member installed at the breaker body and configured to operate the closing latch and trip latch at positions other than the disconnected, test and connected positions while moving up and down by interlocking with the relative motion of the interlock operation rail,
    wherein the cradle has a rail groove which allows the interlock operation rail to operate thereon.

2. The circuit breaker of claim 1, wherein the interlock member includes:
    an interlock plate which is either in contact with or separated from the closing latch and trip latch; and
    an interlock rod which is joined at a bottom of the interlock plate and is in contact with the interlock operation rail.

3. The circuit breaker of claim 2, wherein the interlock member includes a return spring installed on the interlock rod and configured to return the interlock member to a lower position.

4. The circuit breaker of claim 1, wherein a sliding hole is formed at a top of the interlock member to enable upward and downward motion on a protrusion of the breaker body.

5. The circuit breaker of claim 2, wherein the interlock plate includes a first lever that protrudes at one side thereof to contact the closing latch.

6. The circuit breaker of claim 5, wherein the interlock plate includes a second lever that protrudes at one side thereof to contact the trip latch.

7. The circuit breaker of claim 6, wherein an end of the first lever and an end of the second lever are bent and extended upward.

8. The circuit breaker of claim 6, wherein a distance between the ends of the first and second levers is less than the distance between the closing latch and the trip latch.

9. The circuit breaker of claim 1, wherein a gap between the closing latch and the first lever is greater than the gap between the trip latch and the second lever in a state that an external force is not applied.

10. The circuit breaker of claim 2, wherein the interlock plate includes a locking part on a side, which is configured to restrain or release a closing protrusion coupled to move with the closing latch.

11. The circuit breaker of claim 1, wherein the interlock operation rail includes height adjustment blocks with different heights in front and rearward directions at a top.

12. The circuit breaker of claim 11, wherein the height adjustment blocks include grooves in each of the disconnected position, the test position and the connected position.

13. The circuit breaker of claim 12, wherein each groove has the same height.

14. The circuit breaker of claim 12, wherein the height adjustment blocks include a first convex part between the disconnected position and the test position, and the first convex part is formed at a highest height of the height adjustment block.

15. The circuit breaker of claim 14, wherein the height adjustment blocks include a second convex part between the test position and the connected position, and the second convex part is formed to be lower than the first convex part and higher than the grooves.

\* \* \* \* \*